T. LAMB.
STOPPER FOR MILK BOTTLES.
APPLICATION FILED JAN. 11, 1913.
1,087,303.
Patented Feb. 17, 1914.
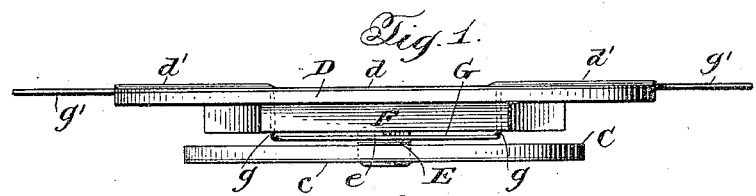
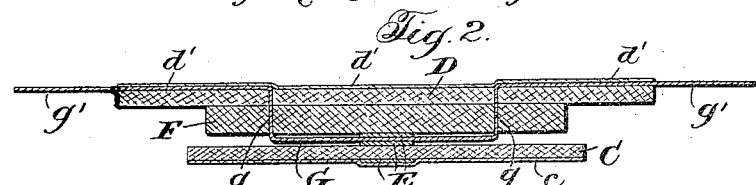
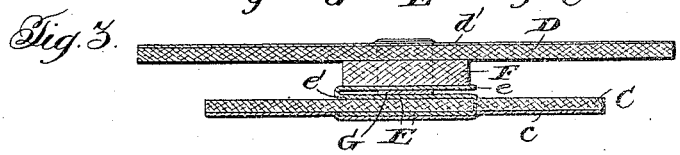
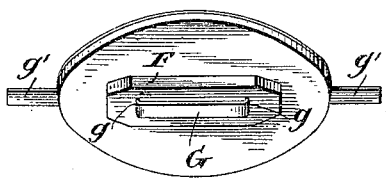
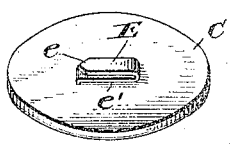
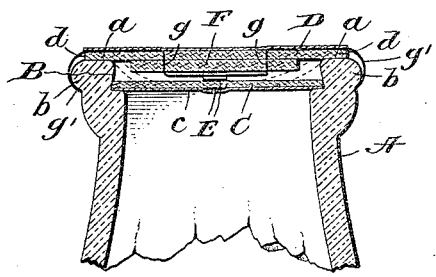
Witnesses:
Jas. E. Hutchinson
G. Wedemeier
Inventor:
Thomas Lamb,
By ＿＿＿＿＿＿ Attorneys

UNITED STATES PATENT OFFICE.

THOMAS LAMB, OF BROOKLYN, NEW YORK.

STOPPER FOR MILK-BOTTLES.

1,087,303.

Specification of Letters Patent. Patented Feb. 17, 1914.

Application filed January 11, 1913. Serial No. 741,556.

*To all whom it may concern:*

Be it known that I, THOMAS LAMB, a citizen of the United States, residing at Brooklyn, in the county of Kings and State of New York, have invented certain new and useful Improvements in Stoppers for Milk-Bottles, of which the following is a specification, reference being had therein to the accompanying drawing.

This invention relates to stoppers for milk bottles and has for its object the provision of an improved stopper of the disk type which will be simple and inexpensive to manufacture, capable of normally creating a double-seal at the mouth of the bottle and possessing characteristics facilitating the removal of the stopper from said mouth. The preferred embodiment of the invention embraces a pair of disks, one adapted to fit a seat within the mouth of the bottle, and the other to overlie the mouth of the bottle to obtain the double sealing action to which I have alluded; the disks being separably connected together and provided with attaching means enabling the use of either one independently of the other, or the use of them together intact; and the connection coupling the two disks together enabling the inner disk to be withdrawn from the bottle under the lifting influence of the upper disk which is exposed to the manipulation of the user.

The above mentioned embodiment of the invention, so far as the characteristic features mentioned are concerned, as well as the many improved details of construction and arrangement of parts thereof, will be readily understood from the specific description hereinafter contained when read in connection with the accompanying drawings, forming part hereof, wherein the device constituting said embodiment is fully illustrated.

In the drawings, Figure 1 is an edge view of the stopper complete, greatly enlarged for the purpose of clearness, Figs. 2 and 3 are sectional views taken at right angles respectively vertically through the stopper as shown in Fig. 1, Fig. 4 is a perspective view of the bottom of the upper disk detached, Fig. 5 is a perspective view of the top of the lower disk detached, and Fig. 6 is a vertical sectional view of the mouth portion of a milk bottle with the stopper applied thereto, also showing in dotted lines the manner of bending the lower disk during its inserting movement.

Referring more specifically to the drawings, wherein like reference letters designate corresponding parts in the several views, A represents the mouth of a milk bottle having a grooved portion B constituting the disk seat and retainer.

C represents the lower disk, conveniently of paper coated with paraffin or the like, although this disk as well as the other elements of the construction may be constructed of material other than that herein specifically defined so long as it may be in keeping with the uses to which a stopper of the character in question is subjected. The diameter of the disk C is slightly greater than the normal diameter of the mouth of the bottle so that said disk when forced home into the groove B the same will be sprung into the grooved portion and be retained in place thereby, the deflection of the marginal portions of the disk C in said inserting movement being shown by dotted lines in the last figure of the drawings.

D is the upper disk, also conveniently of paraffined paper, the same being of a diameter substantially greater than that of the disk C so as to overlie at its marginal portion *d* the upper edge *a* of the bottle mouth A.

In keeping with my conception, the disks C and D are connected together, preferably in a separable manner, for reasons which will hereinafter appear, and the connecting means will now be defined.

The disk C has separated from but parallel with its upper surface a flat tongue E, disposed approximately centrally of the disk, the same being preferably of metal having a tapered end *e* and a shank *e'* which is bent, and passes through the main or body portion of the disk C to the under side of the latter, thence across the under surface and upwardly again through the disk and back beneath the tongue E, where the terminal is pinched into firm holding engagement with the upper surface of the disk. In this manner, the tongue is firmly secured in place by an integral part thereof, obviating the necessity of supplemental fastening devices for the tongue, and the passing of the shank through the disk at separated points prevents turning of the tongue with reference to the disk. The lower, intermediate portion of the shank below the body of the disk C which would expose metal to the bottle contents at this point is covered by a thin sheet of paper, paraffin or treated as desired, this sheet represented at *c* constituting a layer or part of the disk C. The upper disk D has on its lower surface a relatively thick reinforcing and spacing member F, of approximately oblong contour adapted to separate the disks C and D, and to facilitate the forcing of the disk C to its seat B. This member F is secured in place by means of a flat strip of metal, the intermediate portion G of which underlies the member F and constitutes an eye for the introduction of the tongue or hook E of the lower disk. The terminal portions *g* of the eye G are passed upwardly through the spacing member F and through the main or body portion of the upper disk D, and then passed outwardly over the upper surface of the disk and substantially beyond the edges of the latter to constitute flexible extensions *g'*, those portions of the terminals *g* which *g'*, those portions of the terminals *g* which directly overlie the disk D being held in place down against the disk D by a thin piece of paper *d'*. The purpose of the free flexible extensions *g'* is to provide a means adapted to be bent down around the bead *b* at the bottle mouth to provide an additional fastening means for the stopper to hold the same in place, and to provide an extension adapted to be grasped by the fingers to pull the stopper out of the mouth of the bottle. These extensions are also useful in enabling the employment of the top disk D alone as a cover for the bottle, after the inner stopper *c* has been forcibly removed and discarded, as when but a portion of the bottle contents has been used.

It is the purpose to hook the lower disk C to the upper disk D, and then force the stopper into the mouth of the bottle, the relatively stiff member F under pressure causing the lower disk to enter the bottle mouth and seat itself in the retaining groove B, notwithstanding the bending tendency of the marginal portions of the lower disk C. It will be appreciated that, as an incident to forcing the lower disk in place the upward bending of the margin of the same tends to expel the air between the two disks, and when the disk C finally springs into the groove B, with the attending separation of the disks, a vacuum or partial vacuum is formed in the space between the disks which acts to seat more firmly the upper disk on the edge of the bottle mouth to prevent the entrance, and to prevent the settling of dust and the like on the lower disk C.

While I have herein disclosed a specific embodiment of my invention it will be apparent to persons skilled in the art that the invention is capable of embodiment in other forms and devices.

I claim:

1. In a bottle stopper, a disk member having a depending enlargement on its bottom, and means for securing the enlargement to the disk comprising a metal strip having its intermediate portion underlying the enlargement and its terminal portions passed upwardly through the enlargement and through the disk and thence bent down upon the disk, one of the terminal portions extending outwardly beyond the disk to constitute a flexible extension, substantially as described.

2. In a bottle stopper, a disk member having a depending enlargement on its bottom, and means for securing the enlargement to the disk comprising a metal strip having its intermediate portion underlying the enlargement and its terminal portions passed upwardly through the enlargement and through the disk and thence bent down upon the disk, one of the terminal portions extending outwardly beyond the disk to constitute a flexible extension, said intermediate portion being spaced from the under surface of the enlargement to constitute an eye, substantially as described.

3. A stopper of the character described comprising disk members having separable coupling portions therebetween, said coupling portions being releasable by an edgewise movement of one of the disks relative to the other.

4. A bottle stopper of the character described comprising a pair of disks, and separate fastening portions on said disks adapted normally to be engaged within the space between the disks and to be uncoupled to release one disk from the other, substantially as described.

5. A bottle stopper of the character described comprising a pair of disks, separate fastening portions on said disks adapted normally to be engaged within the space between the disks and to be uncoupled to release one disk from the other, and spacing means interposed between the two disks, substantially as described.

6. In a bottle stopper of the character described, a detached disk member adapted to fit a bottle mouth and provided with a tongue projecting above its upper surface and substantially parallel to the upper surface of the disk but spaced from said surface, said tongue having a shank passing through the body of the disk and beneath the same, in combination with a protecting layer underlying the bottom portion of said shank adapted to face the contents of the bottle, substantially as described.

7. A bottle stopper of the character described comprising a pair of disks separably connected together, the connecting means between the disks consisting of a hook and eye connection, the eye comprising an integral continuous metallic strip having its middle portion directly underlying and spaced from the disk to which it is attached to provide an eye disposed transversely of said strip and between the same and the disk, the terminal portions of said strip being passed through and bent upon said disk, substantially as and for the purpose described.

8. A bottle stopper of the character described comprising a pair of disks separably connected together, the connecting means between the disks consisting of a hook and eye connection, the eye comprising an integral continuous strip having its intermediate portion spaced from the disk to which it is attached, and terminal portions passed through said disk, an end of one of the terminal portions being free to constitute a flexible extension adapted to fasten the disk to which it is attached in place, substantially as and for the purpose described.

9. In a bottle stopper, a disk member having a depending enlargement on its bottom, and means for securing the enlargement to the disk comprising an integral continuous metal strip having its intermediate portion underlying the enlargement and spaced therefrom to constitute an eye disposed transversely of the strip, the terminal portions of the strip being passed through the enlargement and through the disk, substantially as described.

In testimony whereof I affix my signature in presence of two witnesses.

THOMAS LAMB.

Witnesses:
A. B. LARKIN,
GEO. L. BOWER.